US009266609B1

(12) United States Patent
Kunz (10) Patent No.: US 9,266,609 B1
(45) Date of Patent: Feb. 23, 2016

(54) DUAL MODE FLIGHT VEHICLE

(71) Applicant: Insitu, Inc., Bingen, WA (US)

(72) Inventor: Peter J. Kunz, The Dalles, OR (US)

(73) Assignee: Insitu, Inc, Bingen, WA (US)

( * ) Notice: Subject to any disclaimer, the term of this patent is extended or adjusted under 35 U.S.C. 154(b) by 0 days.

(21) Appl. No.: 14/518,770

(22) Filed: Oct. 20, 2014

(51) Int. Cl.
*B64C 27/22* (2006.01)
*B64C 29/00* (2006.01)

(52) U.S. Cl.
CPC ......... *B64C 29/0008* (2013.01); *B64C 29/0091* (2013.01)

(58) Field of Classification Search
USPC .......................................... 244/7 R
See application file for complete search history.

(56) References Cited

U.S. PATENT DOCUMENTS

| | | | | | |
|---|---|---|---|---|---|
| 2,412,729 | A | * | 12/1946 | Hall | B64D 1/04 89/1.51 |
| 3,613,498 | A | * | 10/1971 | Riccius | B64D 1/04 244/129.5 |
| 4,382,566 | A | * | 5/1983 | Brand | B64C 31/024 244/119 |
| 4,641,755 | A | * | 2/1987 | Oliver | F24B 39/28 206/3 |
| 4,697,764 | A | * | 10/1987 | Hardy | B64D 1/06 244/129.5 |
| 4,930,398 | A | * | 6/1990 | Sharples | B64D 1/06 244/129.5 |
| 6,113,028 | A | * | 9/2000 | Lohse | B64C 35/00 244/106 |
| 7,748,662 | B2 | * | 7/2010 | Hale | A62C 3/0228 137/899.2 |
| 7,819,362 | B2 | * | 10/2010 | Hale | B64D 1/16 137/899.2 |
| 8,205,822 | B1 | | 6/2012 | Jameson et al. | |

OTHER PUBLICATIONS

Samarai UAV Inspired by Maple Seed—Demo at AUVSI Unmanned Systems 2011; https://www.youtube.com/watch?v=0R4vbDg380A.

* cited by examiner

*Primary Examiner* — Tien Dinh
*Assistant Examiner* — Assres H Woldemaryam
(74) *Attorney, Agent, or Firm* — Miller, Matthias & Hull LLP (57) ABSTRACT

A fixed wing flight vehicle has wing, a center-mounted propulsion unit and a pod that is moveable between a center of the wing and a displaced position at or near one end of the wing. When the pod is at or near the center of the wing, that is, having a center of mass at or near a thrust vector of the propulsion unit, the flight vehicle flies with the characteristics of a regular fixed wing aircraft. However, when the pod is translated to the position at or near an end of the wing, an overall center of mass of the flight vehicle is substantially offset from the thrust vector of the propulsion unit. This causes the flight vehicle to spin like a samara, e.g., a maple seed, so that the flight vehicle can take off or land in a very limited space, much like a helicopter.

20 Claims, 6 Drawing Sheets

DUAL MODE FLIGHT VEHICLE

FIELD

This disclosure relates to a flight vehicle adapted to dual modes of flight.

BACKGROUND

Fixed wing flight vehicles enjoy good stability and control, efficient fuel economy, and good payload carrying capability. However, these vehicles require long take-off and landing areas. Conversely, vertical flight vehicles, such as helicopters, can take off and land vertically in very tight areas but are slower and have reduced endurance compared to a fixed wing vehicles of comparable mass and payload.

SUMMARY

In an aspect of the disclosure, an aerial vehicle may include a wing, a propulsion unit coupled to the wing, and a pod moveably coupled to the wing. The aerial vehicle may also include a translation mechanism that selectively moves the pod between a first position substantially at a lateral centerline of the wing and a second position substantially at an outboard end of the wing. By moving the pod between positions, a center of mass of the aerial vehicle is altered allowing transition between a straight flight mode of a fixed wing aircraft and a rotational mode capable of vertical takeoff and landing.

In another aspect of the disclosure, a method of operating an aerial vehicle having a fixed wing includes providing, in a first flight mode, for a center of mass of the aerial vehicle to be substantially along a lateral centerline of the fixed wing so that in the first flight mode, thrust is substantially in line with the center of mass of the aerial vehicle. In a second flight mode, the center of mass of the aerial vehicle may be altered to be offset from the lateral centerline of the fixed wing so that the thrust is offset from the center of mass of the aerial vehicle which causes the aerial vehicle to rotate about a rotational axis.

In yet another aspect of the disclosure, a method of operating an aerial vehicle having a pod moveably attached to a fixed wing of the aerial vehicle includes setting the pod proximate to a centerline of the fixed wing for use in a first flight mode and launching the aerial vehicle in the first flight mode using a propulsion unit that provides a thrust vector generally aligned with a center of mass of the aerial vehicle. In the first flight mode, the aerial vehicle may be operated as a fixed wing aerial vehicle. The method may also include moving the pod distal to the centerline of the fixed wing for operation of the aerial vehicle in a second flight mode so that a center of mass of the aerial vehicle is offset from a lateral centerline of the fixed wing of the aerial vehicle. In the second flight mode, the method may include recovering the aerial vehicle using a vertical descent caused by rotation of the aerial vehicle about a rotational axis.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
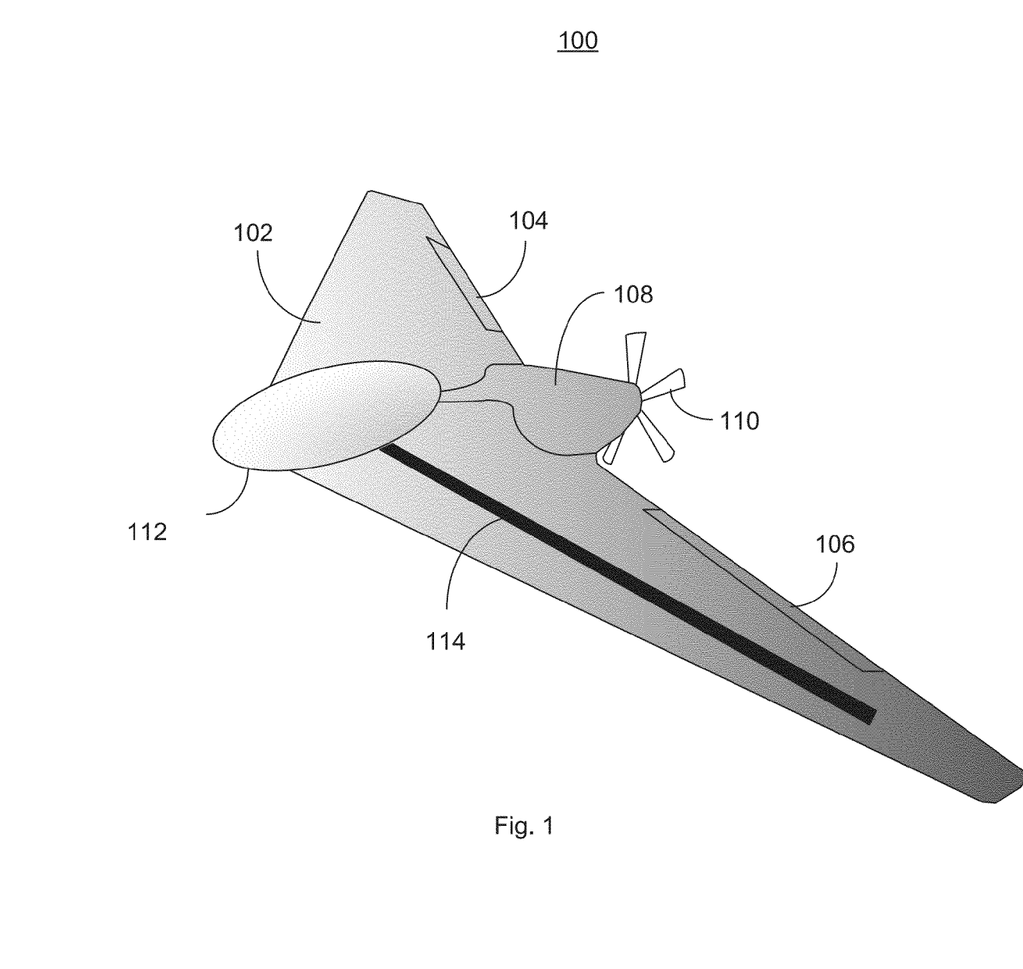
FIG. 1 is a perspective view of an embodiment of an aerial vehicle.

FIG. 1 is a perspective view of an aerial vehicle 100 having a wing 102 and control surfaces 104, 106. The aerial vehicle 100 may also have a propulsion unit 108, which in the exemplary embodiment shown uses a propeller 110. In other embodiments, another kind of propulsion unit 108 may be used. The propulsion unit 108 provides thrust to the aerial vehicle. In various flight modes, discussed below, the thrust is used for straight flight or the thrust may cause rotation of the aerial vehicle 100. When configured as shown in FIG. 1, the aerial vehicle 100 can be piloted like any fixed wing, forward thrust aircraft.

Aerial vehicle 100 also has a pod 112 which may be movable along a track 114. As will be discussed in more detail below, when the pod 112 is positioned along a centerline of the wing 102, a center of mass of the aerial vehicle 100 is generally aligned along both the centerline of the wing and of a thrust vector of the propulsion unit 108. When the pod 112 is moved to an opposite end of the track 114, the center of mass of the aerial vehicle 100 is moved off of the centerline of the wing 102 and also off of the thrust vector of the propulsion unit 108. The effect of this movement of the pod 112 is to change the center of mass of the aerial vehicle 100 in order to cause the aerial vehicle 100 to spin, allowing more or less vertical flight, similar to a samara (seed) of a maple tree. Unlike the maple samara, however, the propulsion unit 108 is able to add power to the aerial vehicle 100 and the control surfaces 104, 106 are able to effect changes in attitude of the wing 102. Thus, the aerial vehicle 100 may be piloted through a controlled vertical descent or even a controlled vertical ascent.

The aerial vehicle 100 may achieve both the benefits of the stability, ease of flight, and payload capability of a fixed wing aircraft and the vertical takeoff and landing capability of a rotary aircraft.

Figure 2:
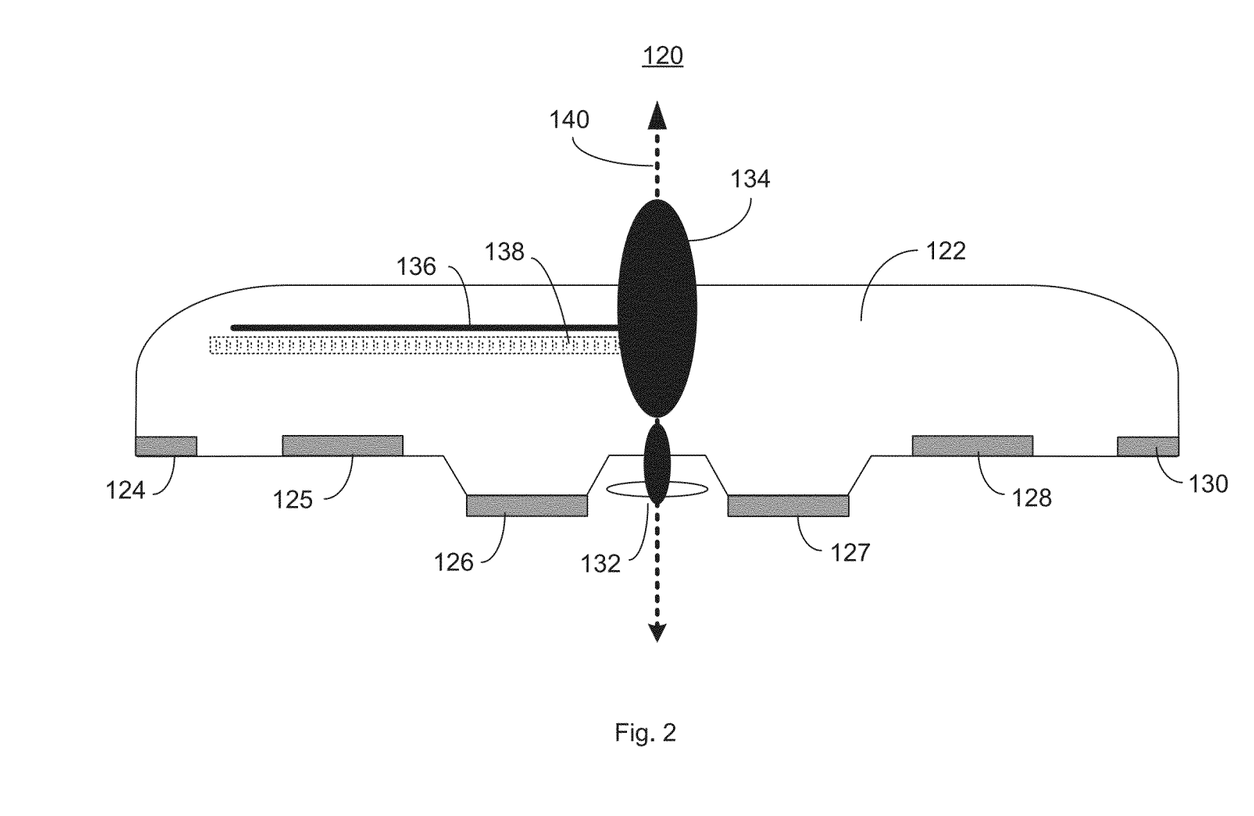
FIG. 2 is a top view of an embodiment of an aerial vehicle.

FIG. 2 is a top view of another embodiment of an aerial vehicle 120. The aerial vehicle 120 may include a wing 122, a plurality of control surfaces 124-130, a propulsion unit 132, a pod 134, a track 136, and a drive mechanism 138. A thrust vector 140 of the propulsion unit 132 is coincident with both a lateral centerline of the wing 122 (that is, a line equidistant between wingtips) and a lateral center of mass of the aerial vehicle 120. For ease of illustration, any small change in the lateral center of mass due to the track 136 and/or drive mechanism 138 are ignored.

In this configuration, or first flight mode, the aerial vehicle 120 performs similarly to any other "flying wing" aircraft. The aerial vehicle 120 exhibits the control stability, fuel economy, and payload capability of such aircraft. Takeoff and landing may be accomplished via a runway in a known fashion, a catapult, or if the aerial vehicle 120 is small enough, it may be hand launched.

Figure 3:
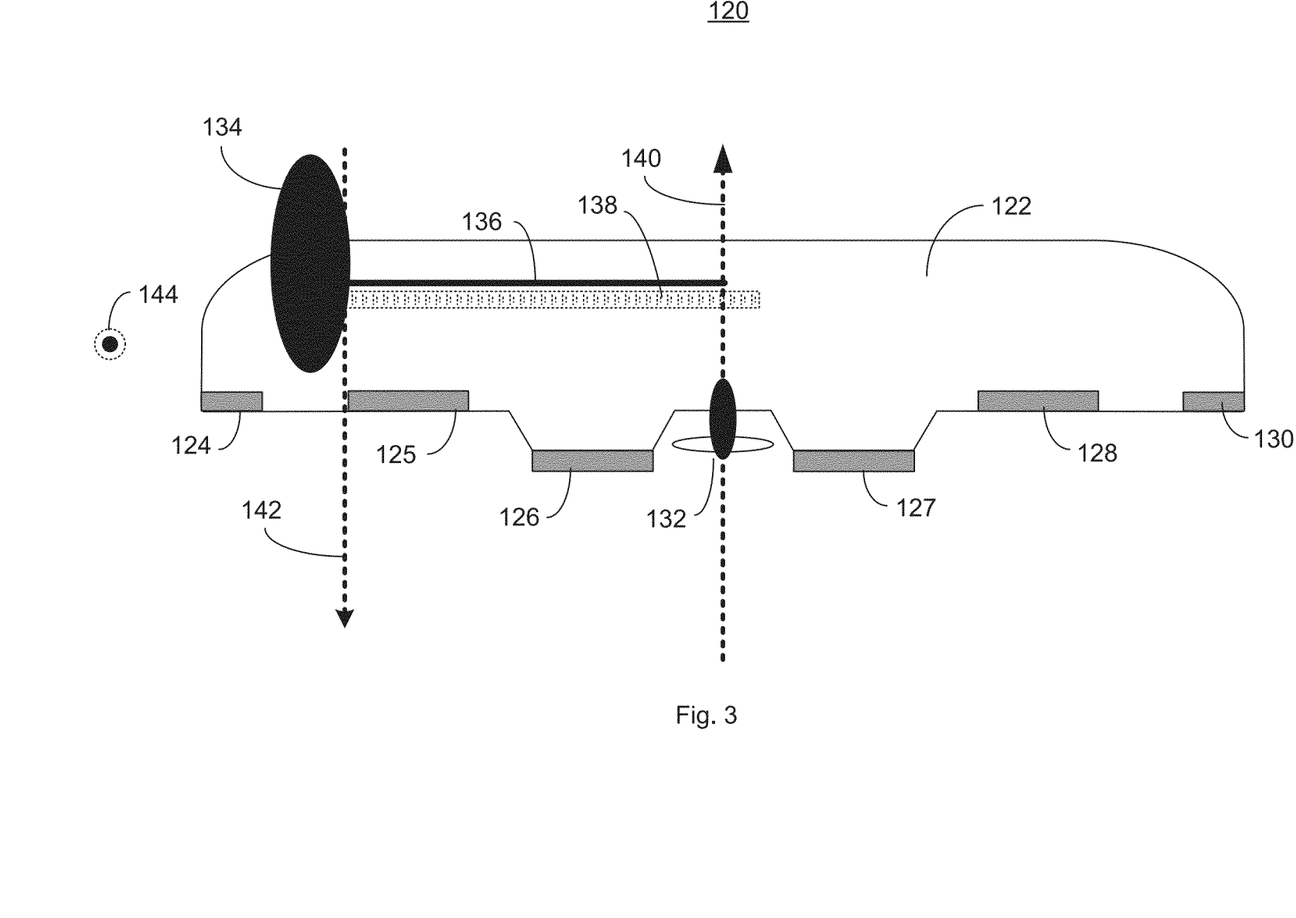
FIG. 3 is a top view of the aerial vehicle of FIG. 3 to in a different configuration.

FIG. 3 is a top view of the aerial vehicle 120 of FIG. 2 shown in another configuration. In this configuration, or second flight mode, the pod 134 is displaced from the thrust vector 140/centerline of the wing 122. The lateral center of mass 142 of the aerial vehicle 120 has shifted off-center. The offset between the thrust vector 140 and the lateral center of mass 142 causes the aerial vehicle 120 to rotate about a rotational axis 144.

The exact location of the lateral center of mass 142 may vary based on factors such as a mass of the pod 134, the mass of the wing 122, and the mass of other components of the aerial vehicle 120 such as the propulsion unit 132. Similarly, the rotational axis 144 may vary based on the mass of the various components and the magnitude of the thrust vector 140 of the propulsion unit 132. In some embodiments, the rotational axis 144 may be farther from the aerial vehicle 120 or may actually be inside the furthest extent of the wing 122.

The rotation of the aerial vehicle 120 provides enough apparent wind speed at an end of the wing 122 opposite the pod 134 to provide both lift and responsiveness to controls, particularly control surfaces 127, 128, and 130.

Figure 4:
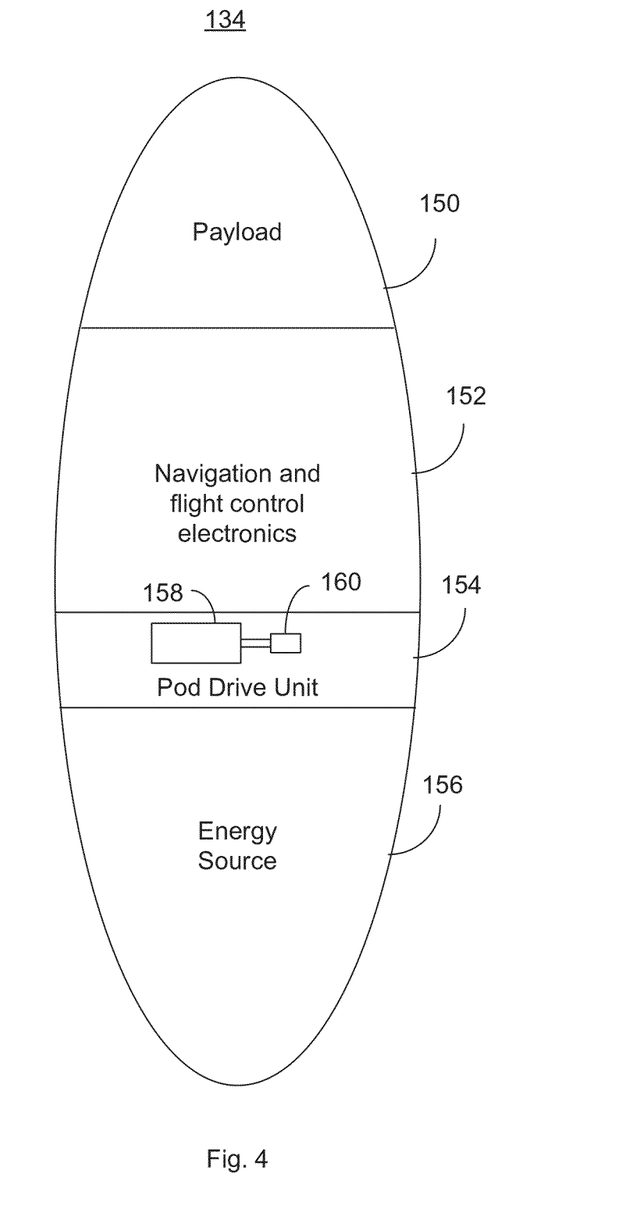
FIG. 4 is an illustration of an exemplary pod.

FIG. 4 is a simplified illustration of an exemplary pod 134 showing various contents of the pod 134. A payload section 150 may carry activity-specific materials such as a camera, medical supplies, or other items in keeping with an overall weight capacity of the aerial vehicle 120. A navigation and flight control electronics section 152 may include a GPS receiver, a controller to manage adjustments to the propulsion unit 132 and control surfaces 124-130, radio communications equipment, navigation lighting, gyroscopes, etc. An energy source 156, for example, containing a fuel tank, a fuel cell, a battery, or another source of energy, either separately or in combination, may be used to power the propulsion unit 132 via either a fuel line or electrical wiring umbilical cord that connects the pod 134 with the propulsion unit 132 and the control surfaces 124-130. A pod drive mechanism 154 may, in one embodiment, include a motor 158 and a transmission 160 that couples to the drive mechanism 138. In an exemplary embodiment, the transmission 160 may include a worm gear and the drive mechanism 138 may be a threaded rod. In other embodiments, the transmission 160 may include a wheel or a gear that engages the drive mechanism 138 in the form of a track or strip with perforations that mesh with the teeth of the gear. This arrangement of the elements in the pod 134 is merely for an exemplary embodiment. More or less equipment and components or a different arrangement of equipment and components may be used based the needs of the actual aerial vehicle and its field of operation. The function of the motor 158 and/or transmission 160 is to move the pod 134 from a centerline position to an outboard position. In some embodiments, the motor 158 may only drive the pod 134 in one direction, while in other embodiments, the motor 158 may drive the pod 134 in both directions.

Figure 5:
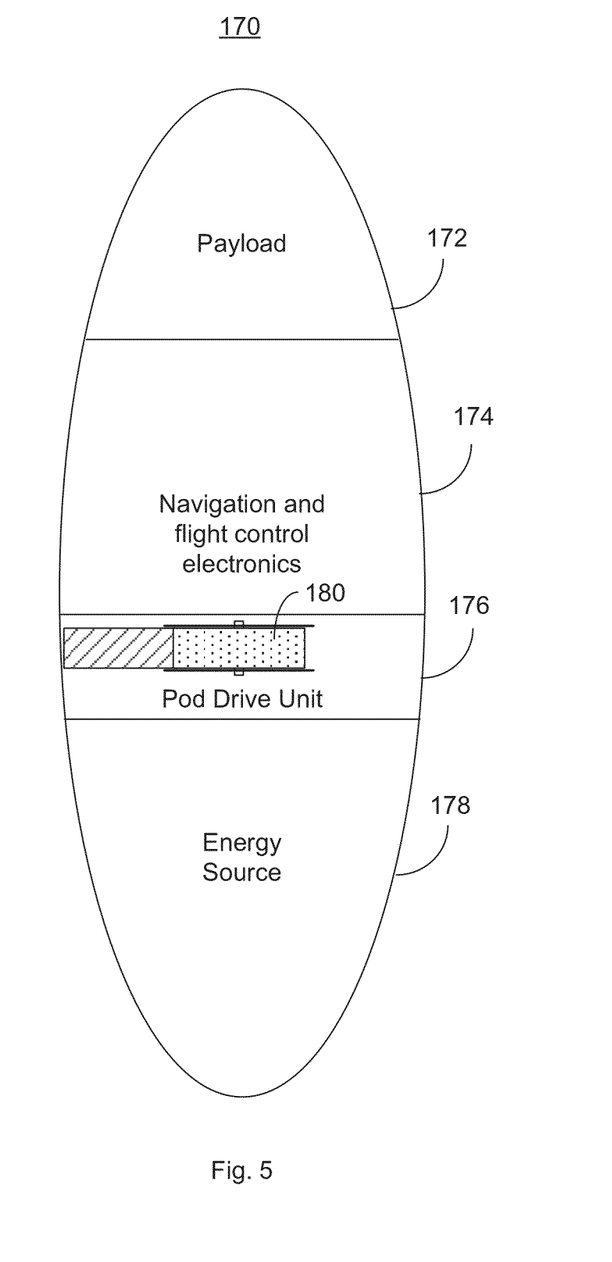
FIG. 5 is an illustration of another exemplary pod.

FIG. 5 illustrates another embodiment of a pod 170. The pod 170 is similar to the pod 134 in that it has a payload section 172, a navigation and flight control electronics section 174, and a fuel or battery section 178. In the embodiment of FIG. 5 the pod drive unit 176 may include a spring mechanism 180 such as a clock spring that may be unrolled to place the pod 170 in one position, for example, in the center of the wing 122. When the spring mechanism 180 is released, tension in the spring mechanism 180 may cause the pod 170 to move to the opposite position. In this embodiment, the mass of the unrolled spring is spread over the length of the track 136 when operating in a straight flight flight mode. When operating in a rotational flight mode with the pod 170 off-center, the entire mass of the spring mechanism 180 is rolled into the pod 170 and is located at the outboard position. This additional mass further contributes to the offset between the thrust vector 140 and center of mass 142.

Unlike the motor 158, the use of the spring mechanism 180 may allow only a single transition between flight modes, that is, between straight flight mode and rotational mode or between rotational mode and straight flight mode. Alternatively, the single the transition may be from rotational mode to straight flight mode, depending on the nature of the environment in which the aerial vehicle 120 is deployed. In another embodiment, the spring mechanism 180 may simply be a shock cord or elastic band.

Figure 6:
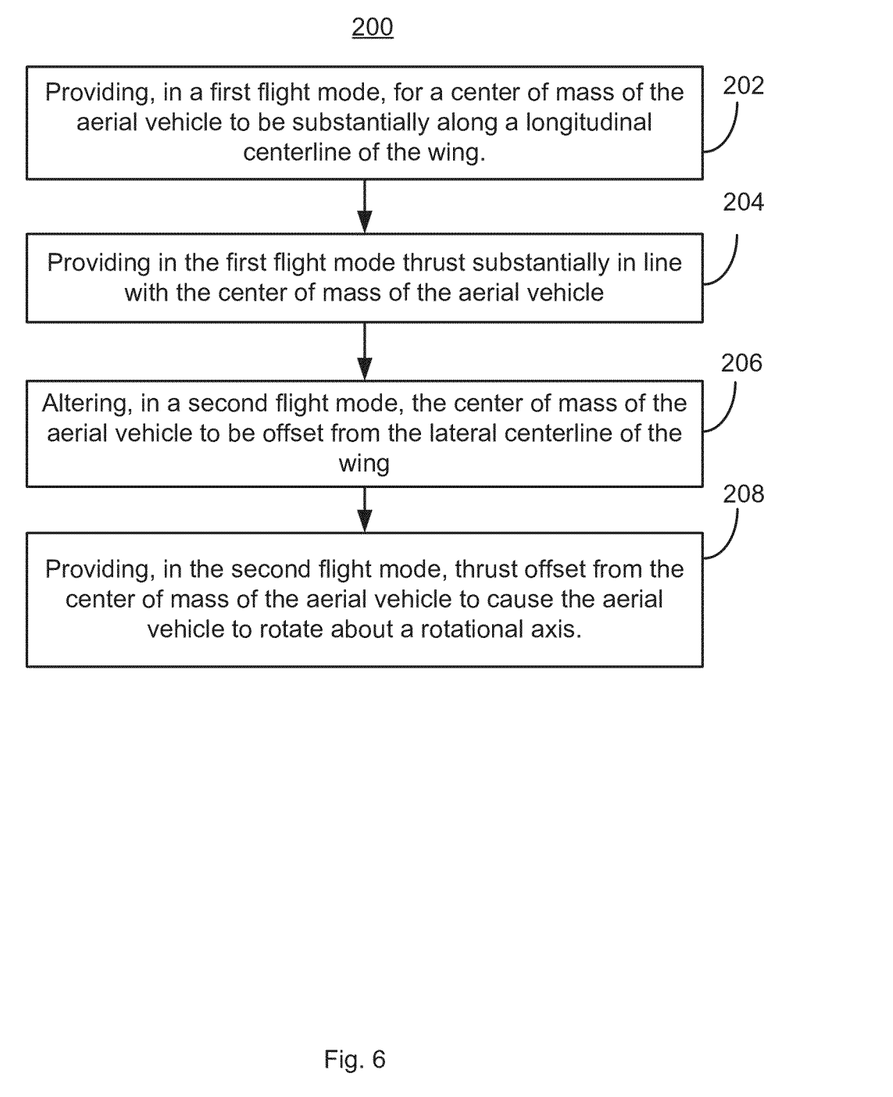
FIG. 6 is a flowchart of a method of operating an aerial vehicle.

FIG. 6 is a flowchart of a method 200 of operating an aerial vehicle 120. At a block 202, the aerial vehicle 120 may be configured for a first flight mode as a conventional fixed wing aircraft. A pod 134 may be located at a lateral centerline of the wing 122 of the aerial vehicle 120. The pod 134 may contain, for example, a payload section 150, an energy source 156, control electronics and navigation equipment section 152, and a pod drive mechanism 154. With the pod 134 located at the lateral centerline of the wing 122, a center of mass 142 of the aerial vehicle 120 may be proximate to both a thrust vector 140 of a propulsion unit 132 and the lateral centerline of the wing 122.

At block 204, the propulsion unit 132 may provide thrust that is substantially in line with the center of mass of the aerial vehicle. In this first flight mode the aerial vehicle 120 may be launched using a runway, catapult, or by hand, depending on size and weight of the aerial vehicle 120.

At a block 206, the center of mass of the aerial vehicle 120 may be offset from the lateral centerline of the wing 122. In an embodiment, the pod 134 may be moved along a track 136 to a position distal to the centerline at or near one wingtip of the wing 122 so that an overall center of mass is moved away from the lateral centerline of the wing 122. Movement of the pod 134 may be accomplished while the aerial vehicle 120 is in flight so that the flight mode of the aerial vehicle 120 can be changed while in the air.

At block 208, in the second flight mode the thrust from the propulsion unit 132 may be offset from the center of mass of the aerial vehicle 120 because by moving the pod 134 the center of mass has been changed while the thrust vector 140 from the fixed propulsion unit 132 remains in the same position. In an alternate embodiment, the pod 134 may be maintained along a centerline of the wing 122 and the propulsion unit 132 may be moved outward toward a wingtip. In yet another embodiment, both the pod 134 and the propulsion unit 132 may be moved to opposite ends of the wing 122. In still another embodiment, an alternate propulsion unit (not depicted) may be permanently located at an outward position for use only when the pod 134 is positioned at its outward location. By moving the propulsion unit 132 or providing for an alternate propulsion unit at the wingtip the rotational axis 144 of the aerial vehicle 120 in the second flight mode may be moved inward and/or the rotation speed may be increased, which may provide additional control while in the vertical flight mode of operation.

In operation, with the pod 134 set along the centerline of the wing 122, the aerial vehicle may operate as a standard fixed wing aircraft. When the pod 134 is offset to one end of the wing 122, the aerial vehicle may assume a vertical flight capability allowing launch and/or recovery in confined areas where a runway or similar clear access may not be available.

When descending in the vertical flight mode, the propulsion unit 132 may or may not be engaged depending upon an amount of control required, a freefall rate of descent, and safety issues for recovery personnel if the propulsion unit 132 is operating.

In other embodiments, partial movement of the pod 134 between endpoints of the track 136 may create a natural spiral effect which could in theory be implemented simply by using the flight control surfaces 124-130 but that may in practice be simpler to execute with the aid of the offset of the mass of the pod 134.

Flight Mode Descriptions

As discussed above, an aerial vehicle, such as aerial vehicle 120 may operate in two basic modes, a straight flight mode and a rotational flight mode. In the straight flight mode, the aerial vehicle 120 may operate as a typical fixed wing aircraft. Launching may be accomplished in several different ways. The aerial vehicle 120 may taxi using fixed or retractable wheels (not depicted) on a runway or other surface, or waterway if floats are used, and build up speed until sufficient lift is generated for flight. In various embodiments depending on the size of the aerial vehicle 120 and the launch area, a catapult or sling may be used to shorten the distance needed to achieve rotation speed (speed at which the aerial vehicle can lift off) or the aerial vehicle 120 can be hand launched. The aerial vehicle 120 may climb out at a standard rate for a given control surface setting and airspeed. Once at altitude, the aerial vehicle may fly straight and level, turn, ascend and descend using standard controls and propulsion unit settings. The range of the aerial vehicle may be set by the efficiency of the propulsion unit 132 and the amount of energy available from the energy source 156 in the form of electricity from a battery or fuel cell, or combustible fuel, for example.

To recover the aerial vehicle 120 in straight flight mode, the aerial vehicle may be aligned with a runway, grass strip, waterway, etc. and guided to a landing by descending using a combination of power settings and control surface adjustments in a known manner. One or more of the control surfaces 124-130 may be or include retractable flaps to allow control of the aerial vehicle 120 at lower airspeeds. The aerial vehicle 120 may land on wheels or floats, if provided, or may enter a low-speed stall and land in a low-altitude controlled crash. In some embodiments, the aerial vehicle may be hand recovered during low-speed flight.

In the rotary flight mode, with the pod 134 offset, a rotary launch may be accomplished using a launcher or pivoting wheel (not depicted) that allows the aerial vehicle 120 to gain angular velocity about a rotational axis. When the aerial vehicle 120 has enough angular velocity and a corresponding wind speed over enough of the wing surface to create lift, the aerial vehicle 120 may begin to rise. Control surfaces farthest from the rotational axis, such as control surfaces 128 and 130 may have the most influence on flight because they experience the highest virtual airspeed. As above, some of the control surfaces 124-130, particularly again, control surfaces 128 and 130 may be or include retractable flaps to provide more lift surface during takeoff and recovery. In some embodiments, retractable flaps may be used at all times during rotary flight mode. After the aerial vehicle has risen to a flight altitude, the rotary flight mode may be maintained using the control surfaces 124-130 to maintain a location or to steer in a desired direction. Power adjustments to the propulsion unit 132 may be used to adjust altitude. Increased power may increase altitude and decreased power may cause the aerial vehicle 120 to descend.

To recovery the aerial vehicle 120 in rotary flight mode the aerial vehicle may be piloted to a recovery location and power decreased so that the angular velocity of the aerial vehicle 120 may be reduced, correspondingly reducing the lift provided by the wing 122. As the lift is decreased, the aerial vehicle may descend. In an embodiment, depending on the total mass and distribution of mass, the aerial vehicle 120 may accomplish an acceptable landing in rotary flight mode with no power applied by the propulsion unit, that is, entirely in a passive mode. In either flight mode, an acceptable landing may range from a damage-free landing, to a easily repaired amount of damage, to a substantial amount of damage as long as the payload is protected or recoverable.

As in the straight flight mode, fixed or retractable wheels may allow the aerial vehicle to land or the aerial vehicle 120 may land in a low-altitude controlled crash.

Transition between flight modes may be accomplished anytime the aerial vehicle 120 has sufficient altitude and maneuvering space. To transition from straight flight mode to rotary flight mode, the pod 134 may be translated from an axial centerline of the aerial vehicle (along thrust centerline 140) to an offset position. During the transition, the aerial vehicle may begin a broad spiral that becomes tighter as the pod 134 reaches its final offset location. In some embodiments, such as when using a spring or shock cord to move the pod 134, the movement of the pod 134 may be abrupt and the transition from linear velocity to angular velocity may be fairly quick with minimal loss of altitude. Changes to the control surfaces, such as deployment of flaps, if used, may be synchronized with the transition of the pod 134. In an embodiment, the propulsion unit may be depowered i.e. turned off or variable pitch propellers set to neutral during the translation of the pod. In such an embodiment, the aerial vehicle may experience some loss of altitude which must be accounted for when determining a minimum safe altitude for the transition.

Transition from rotary flight mode to straight flight mode is essentially the reverse of the straight flight mode to rotary flight mode transition. The aerial vehicle 120, after reaching an appropriate altitude may transition the pod 134 from an outboard position to a centerline position. During the transition the angular velocity of the aerial vehicle will decrease as the linear velocity increases and lift is developed across the entire surface of the wing 122. Any asymmetrical components used in the rotary flight mode, such as flaps on the distal end of the wing 122 (the end of the wing with control surface 130) from the pod 134 may be balanced on both ends of the wing by adding flaps to the pod-end or retracting the flaps on the distal end.

INDUSTRIAL APPLICABILITY

The ability of an aerial vehicle 120 to change flight modes between straight-line flight and vertical takeoff and recovery provides a significant advantage over either fixed wing aircraft such as drones or vertical takeoff and landing vehicles such as quadcopters or helicopters. For example, firefighters or military personnel in a forested area may be able to launch an aerial vehicle 120 configured for surveillance from a confined area while receiving the benefits of the endurance, speed, wide range and stable flight characteristics of a fixed wing aircraft. Similarly, an aerial vehicle 120 may be launched at a conventional air field and recovered at the end of a run in a vertical flight mode that does not require a runway or a highly skilled remote pilot and the attendant radio communication links.

While only certain embodiments have been set forth, alternatives and modifications will be apparent from the above description to those skilled in the art. These and other alternatives are considered equivalents and within the spirit and scope of this disclosure and the appended claims.

In summary, various aspects of the disclosed embodiments include:

1. An aerial vehicle comprising:
a wing;
a propulsion unit coupled to the wing;
a pod moveably coupled to the wing; and
a translation mechanism that selectively moves the pod laterally along the wing.

2. An additional aspect of aspect 1, wherein the propulsion unit is oriented to provide thrust substantially along a lateral centerline of the wing.

3. An additional aspect of any of aspects 1-2, wherein when the pod is at a first position substantially at a lateral centerline of the wing, a center of mass of the aerial vehicle is substantially aligned with the lateral centerline of the wing.

4. An additional aspect of any of aspects 1-3, wherein when the pod is at a second position substantially at an outboard end of the wing, a center of mass of the aerial vehicle is offset from a lateral centerline of the wing.

5. An additional aspect of any of aspects 1-4, wherein the translation mechanism provides, in flight, one-time movement of the pod laterally along the wing.

6. An additional aspect of any of aspects 1-5, wherein the translation mechanism is a spring.

7. An additional aspect of any of aspects 1-6, wherein the translation mechanism provides, in flight, two-way movement laterally along the wing.

8. An additional aspect of any of aspects 1-7, wherein the translation mechanism is a motor.

9. An additional aspect of any of aspects 1-8, wherein the pod contains flight controls, a payload, and an energy source used to power the propulsion unit.

10. An additional aspect of any of aspects 1-9, wherein the pod further contains the translation mechanism.

11. A method of enhancing operation of an aerial vehicle having a fixed wing, the method comprising:
providing, in a first flight mode, for a center of mass of the aerial vehicle to be substantially along a lateral centerline of the fixed wing;
providing, in the first flight mode, thrust substantially in line with the center of mass of the aerial vehicle;
altering, in a second flight mode, the center of mass of the aerial vehicle to be offset from the lateral centerline of the fixed wing; and
providing, in the second flight mode, thrust offset from the center of mass of the aerial vehicle that causes the aerial vehicle to rotate about a rotational axis.

12. An additional aspect of aspect 11, wherein altering the center of mass of the aerial vehicle comprises moving a pod between a first position generally aligned with the lateral centerline of the fixed wing and a second position away from the lateral centerline of the fixed wing.

13. An additional aspect of any of aspects 11-12, wherein the pod contains an energy source and a payload of the aerial vehicle.

14. An additional aspect of any of aspects 11-13, wherein moving the pod comprises operating a motor in the pod to drive the pod along a track coupled to the fixed wing.

15. An additional aspect of any of aspects 11-14, further comprising operating the motor to move the pod from one of the first position or the second position to an opposite position.

16. An additional aspect of any of aspects 11-15, wherein moving the pod comprises activating a spring to drive the pod along a track coupled to the fixed wing.

17. A method of method of enhancing operation of an aerial vehicle having a pod moveably attached to a fixed wing of the aerial vehicle, the method comprising:
setting the pod proximate to a centerline of the fixed wing for use in a first flight mode;
launching the aerial vehicle in the first flight mode using a propulsion unit that provides a thrust vector generally aligned with a center of mass of the aerial vehicle;
operating the aerial vehicle in the first flight mode as a fixed wing aerial vehicle;
moving the pod distal to the centerline of the fixed wing for operation of the aerial vehicle in a second flight mode wherein the center of mass of the aerial vehicle is offset from a lateral centerline of the fixed wing of the aerial vehicle;
recovering the aerial vehicle in the second flight mode using a vertical descent caused by rotation of the aerial vehicle about a rotational axis.

18. An additional aspect of aspect 17, wherein recovering the aerial vehicle comprises recovering the aerial vehicle with the propulsion unit disabled.

19. An additional aspect of any of aspects 17-18, further comprising: launching the aerial vehicle in the second flight mode in a vertical ascent using the rotation of the aerial vehicle powered by the propulsion unit.

20. An additional aspect of any of aspects 17-19, wherein the pod contains a payload and an energy source used to power the propulsion unit.

What is claimed:
1. An aerial vehicle comprising:
a wing;
a propulsion unit coupled to the wing;
a pod moveably coupled to the wing; and
a translation mechanism that selectively moves the pod laterally along the wing between a first flight mode with thrust from the propulsion unit substantially in line with the center of mass of the aerial vehicle and a second flight mode with the center of mass of the aerial vehicle offset from the lateral centerline of the fixed wing.

2. The aerial vehicle of claim 1, wherein the propulsion unit is oriented to provide thrust substantially along a lateral centerline of the wing.

3. The aerial vehicle of claim 1, wherein when the pod is at a first position substantially at a lateral centerline of the wing, a center of mass of the aerial vehicle is substantially aligned with the lateral centerline of the wing.

4. The aerial vehicle of claim 1, wherein when the pod is at a second position substantially at an outboard end of the wing, a center of mass of the aerial vehicle is offset from a lateral centerline of the wing.

5. The aerial vehicle of claim 1, wherein the translation mechanism provides, in flight, one-time movement of the pod laterally along the wing.

6. The aerial vehicle of claim 5, wherein the translation mechanism is a spring.

7. The aerial vehicle of claim 1, wherein the translation mechanism provides, in flight, two-way movement laterally along the wing.

8. The aerial vehicle of claim 7, wherein the translation mechanism is a motor.

9. The aerial vehicle of claim 1, wherein the pod contains flight controls, a payload, and an energy source used to power the propulsion unit.

10. The aerial vehicle of claim 9, wherein the pod further contains the translation mechanism.

11. A method of enhancing operation of an aerial vehicle, the method comprising:

providing, in a first flight mode, for a center of mass of the aerial vehicle to be substantially along a lateral centerline of a fixed wing;

providing, in the first flight mode, thrust substantially in line with the center of mass of the aerial vehicle;

altering, in a second flight mode, the center of mass of the aerial vehicle to be offset from the lateral centerline of the fixed wing via a translation mechanism that selectively moves the pod laterally along the wing; and providing, in the second flight mode, thrust offset from the center of mass of the aerial vehicle that causes the aerial vehicle to rotate about a rotational axis.

12. The method of claim 11, wherein altering the center of mass of the aerial vehicle comprises moving a pod between a first position generally aligned with the lateral centerline of the fixed wing and a second position away from the lateral centerline of the fixed wing.

13. The method of claim 12, wherein the pod contains an energy source and a payload of the aerial vehicle.

14. The method of claim 12, wherein moving the pod comprises operating a motor in the pod to drive the pod along a track coupled to the fixed wing.

15. The method of claim 14, further comprising operating the motor to move the pod from one of the first position to the second position or the second position to the first position.

16. The method of claim 12, wherein moving the pod comprises activating a spring to drive the pod along a track coupled to the fixed wing.

17. A method of enhancing operation of an aerial vehicle having a pod moveably attached to a fixed wing of the aerial vehicle, the method comprising:

setting the pod proximate to a centerline of the fixed wing for use in a first flight mode;

launching the aerial vehicle in the first flight mode using a propulsion unit that provides a thrust vector generally aligned with a center of mass of the aerial vehicle;

operating the aerial vehicle in the first flight mode as a fixed wing aerial vehicle;

moving the pod distal to the centerline of the fixed wing for operation of the aerial vehicle in a second flight mode via a translation mechanism that selectively moves the pod laterally along the wing wherein the center of mass of the aerial vehicle is offset from a lateral centerline of the fixed wing of the aerial vehicle;

recovering the aerial vehicle in the second flight mode using a vertical descent caused by rotation of the aerial vehicle about a rotational axis.

18. The method of claim 17, wherein recovering the aerial vehicle comprises recovering the aerial vehicle with the propulsion unit disabled.

19. The method of claim 17, further comprising:

launching the aerial vehicle in the second flight mode in a vertical ascent using the rotation of the aerial vehicle powered by the propulsion unit.

20. The method of claim 17, wherein the pod contains a payload and an energy source used to power the propulsion unit.

* * * * *